F. J. POTHS.
RESILIENT WHEEL.
APPLICATION FILED JUNE 25, 1907.

No. 915,884.

Patented Mar. 23, 1909.
4 SHEETS—SHEET 1.

Witnesses:
Arthur E. Jumpe
William Schultz

Inventor
Friedrich Julius Poths

F. J. POTHS.
RESILIENT WHEEL.
APPLICATION FILED JUNE 25, 1907.

915,884.

Patented Mar. 23, 1909.
4 SHEETS—SHEET 2.

Witnesses:

Inventor.
Friedrich Julius Poths

F. J. POTHS.
RESILIENT WHEEL.
APPLICATION FILED JUNE 25, 1907.
915,884.
Patented Mar. 23, 1909.
4 SHEETS—SHEET 3.
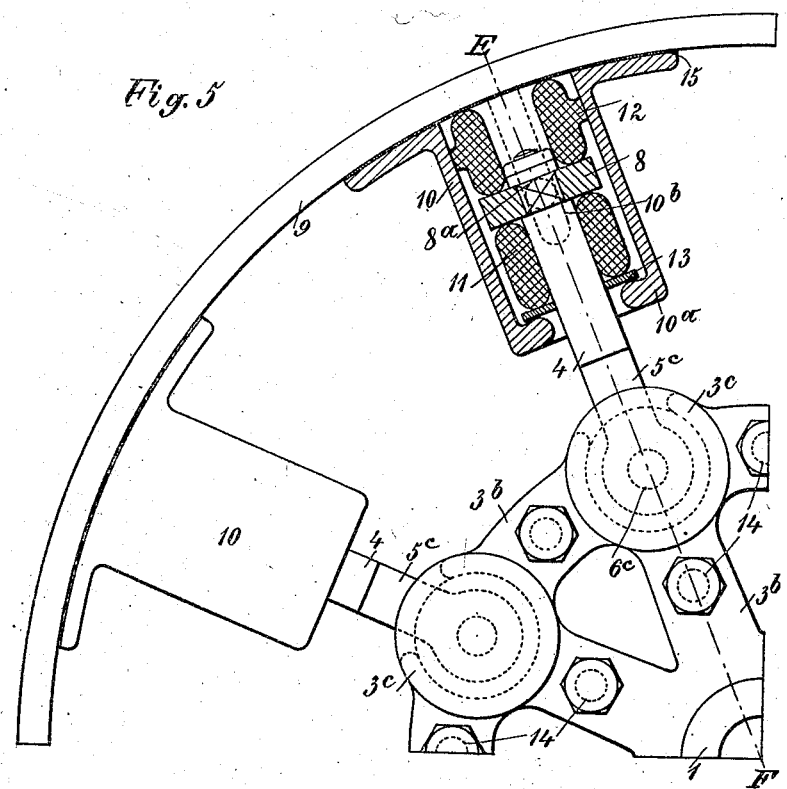
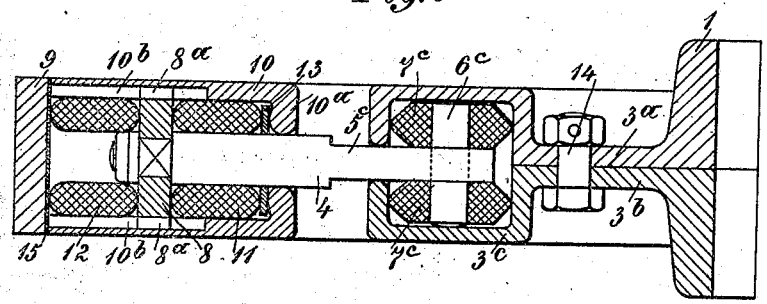

F. J. POTHS.
RESILIENT WHEEL.
APPLICATION FILED JUNE 25, 1907.

915,884.

Patented Mar. 23, 1909.

4 SHEETS—SHEET 4

Witnesses:
Arthur E. Zumpe
William Schulz

Inventor:
Friedrich Julius Poths
by Frank V. Briesen Atty

UNITED STATES PATENT OFFICE.

FRIEDRICH JULIUS POTHS, OF HAMBURG, GERMANY.

RESILIENT WHEEL.

No. 915,834.　　　Specification of Letters Patent.　　　Patented March 23, 1909.

Application filed June 25, 1907. Serial No. 380,789.

*To all whom it may concern:*

Be it known that I, FRIEDRICH JULIUS POTHS, a citizen of the German Empire, and resident of No. 36 Sandweg, Hamburg, Germany, have invented certain new and useful Improvements in Resilient Wheels, of which the following is a specification.

The invention relates to a resilient wheel for vehicles of all kinds, and is broadly characterized by the fact that an external wheel member is arranged by means of spokes on a central rigid wheel member, the inner and outer ends of the spokes of the outer wheel member being provided with india rubber cushions, of which the inner cushions are arranged on bolts in eyes in the rigid wheel member or in the spokes and the outer cushions in caps, which may be made in two parts, and which are rigidly connected with the wheel rim.

Three constructional forms of the novel wheel are illustrated in the accompanying drawing, in which:—

Figure 1:
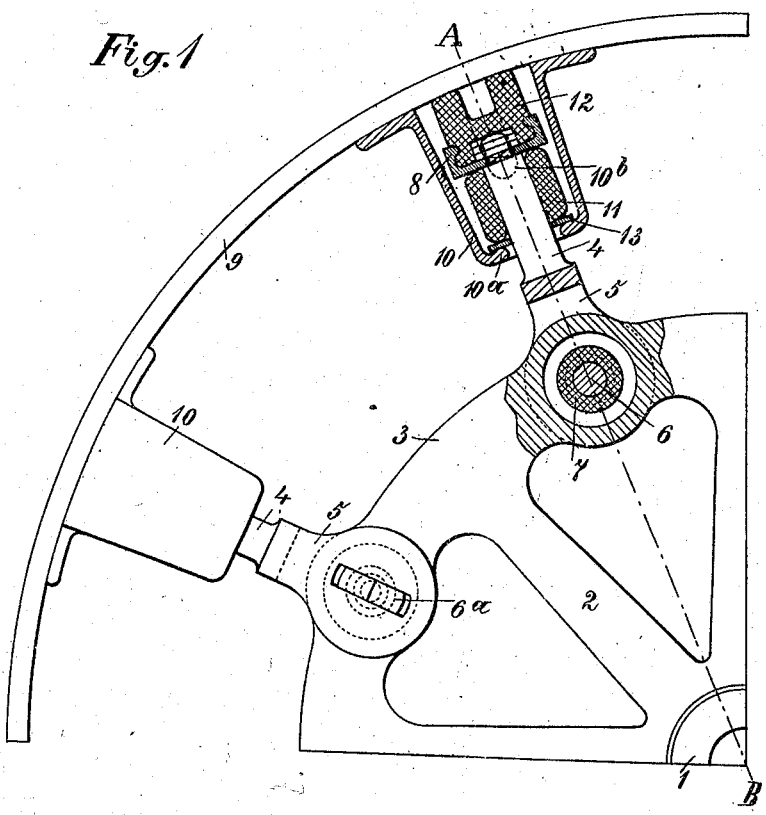
Figure 2:
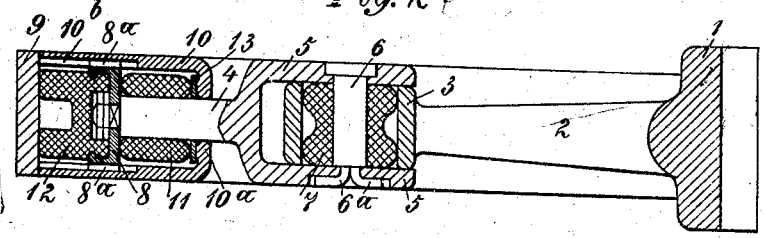
Figure 3:
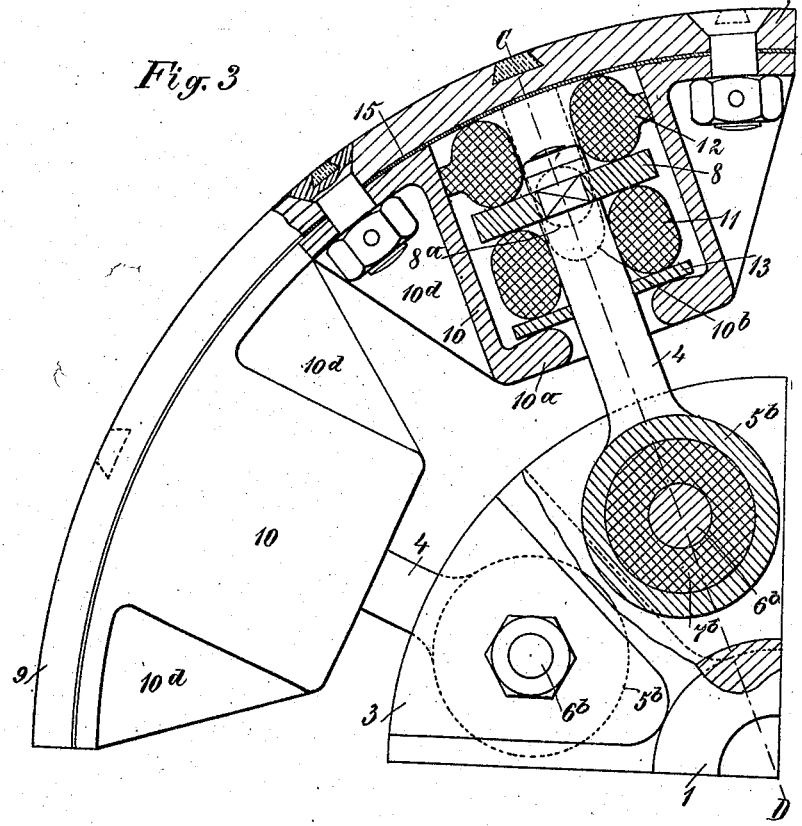
Figure 4:
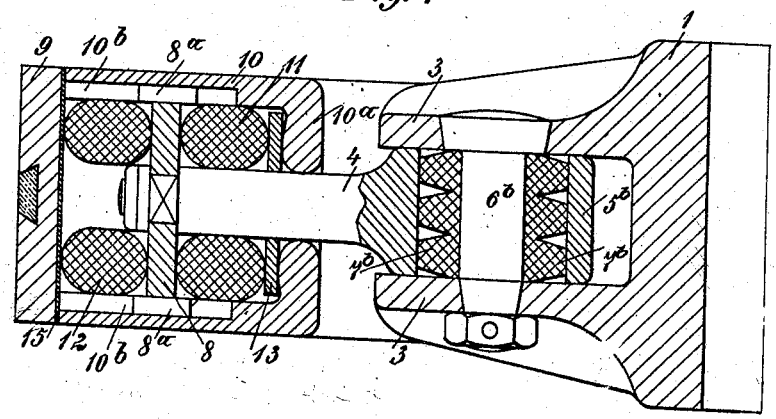
Figure 7:
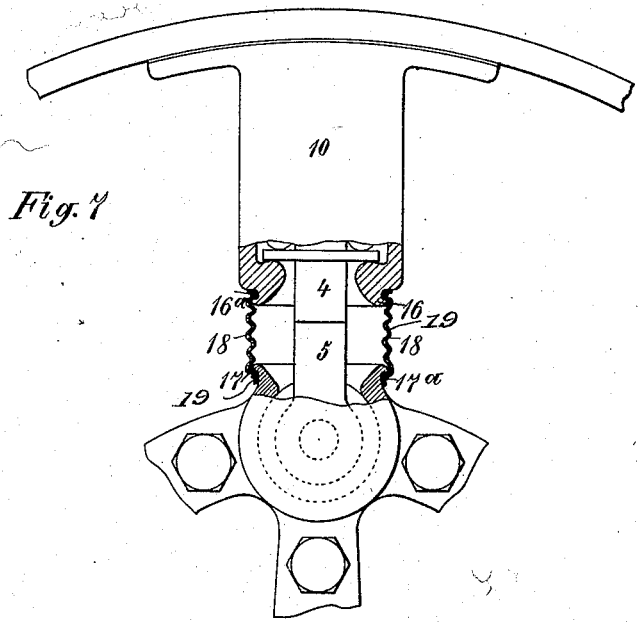
Figure 8:
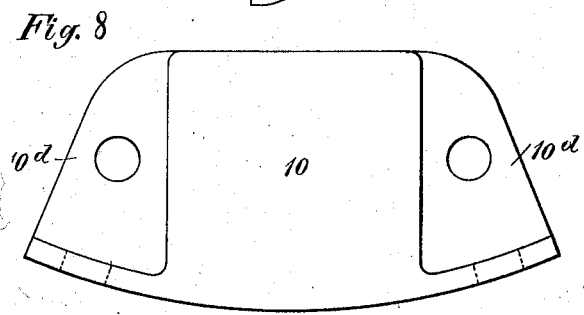
Figure 9:
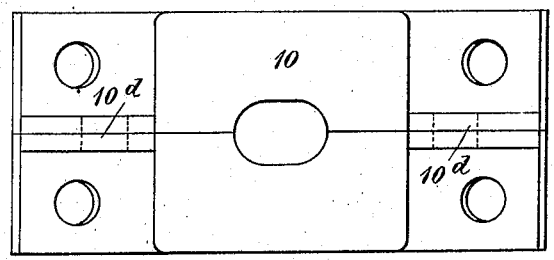

Figures 1, 3 and 5 are side elevations, partly in section, of a quarter of a wheel, Figs. 2, 4 and 6 represent sections on the line A—B, C—D, and E—F of Figs. 1, 3 and 5 respectively. Fig. 7 is a section of a modification, and Figs. 8 and 9 are details of a modification of the cap.

The spokes 2 of the inner wheel member are rigidly connected on the one hand with the hub 1 and on the other hand with a crown 3, or the hub 1, the spokes 2 and the crown 3 may form one piece. The spokes 4 of the outer wheel member are jointed to the crown 3 between each pair of spokes 2. Each of the spokes 4 is provided on its inner end with a fork 5, with which it engages the crown 3. The spokes 4 are jointed to the crown 3 by means of the bolts 6. The bolts 6 are surrounded by india rubber rings 7 which fit into the holes in the crown 3. By this means the connection between the spokes 4 and the crown 3 is rendered resilient. The bolts 6 are secured by bending over their off-set ends 6ª, which are formed as a split pin, or in any other suitable manner.

Plates 8 are rigidly connected to the outer ends of the spokes 4, each plate being surrounded by a cap 10 rigidly connected with the wheel rim 9, and being provided with two round pins 8ª which are fitted into the radial grooves 10ᵇ of the cap 10, in which grooves they are able to move; they form pivots for the spokes 4 which are also jointed to the crown 3.

Inside and outside each of the plates 8, an india rubber cushion 11 and 12 respectively is provided, both being inclosed by the cap 10. The cushion 11 is passed over the spoke 4 and is held between the plate 8 and a second plate 13, or the bottom of the cap 10ª, which is passed over the spoke 4. The cushion 12 is located between the wheel rim 9 and the plate 8, which for the purpose of holding it is provided with a recess and an inner edge. The cushions 12 may however be arranged loosely between the plate 8 and rim 9.

Figs. 3 and 4 illustrate a form of wheel suited for heavy vehicles. In this constructional form, the inner ends of the spokes are provided with eyes 5ᵇ which are received between two plates 3 rigidly attached to the hub 1, and to which they are resiliently jointed by means of bolts 6ᵇ and india rubber rings 7ᵇ passed around the latter, these rings each being composed of a number of washers of appropriate section if desired.

In the third constructional form of wheel for lighter vehicles which is illustrated in Figs. 5 and 6, the central wheel member consists of two equal disk-shaped parts 3ª and 3ᵇ which are bolted together by means of screw bolts 14; at their edges these parts form chambers 3ᶜ in which the flattened ends 5ᶜ of the spokes 4 are yieldingly mounted by means of their india rubber rings 7ᶜ carried by the bolts 6ᶜ.

A strip 15 of oiled paper, felt, india rubber or the like, may be inserted between the wheel rim 9 and the caps 10, thus constituting not only a water and dust tight joint between the abutting faces, but also an absorber of the noise caused in traveling over stone pavement.

In order to facilitate the dismounting of individual spokes 4 the caps 10 which are rigidly connected to the wheel rim 9 may be divided as shown in Figs. 8 and 9 of the drawing. The lugs 10ᵈ provided on the two cap members for the purpose of uniting them likewise serve as stiffening ribs.

Fig. 7 shows by way of example a form of dust and water tight joint between a cap 10 and the crown 3 of the inner wheel member. In order to constitute this joint, annular projections 16 and 17 are arranged on the caps and on the crown and provided with grooves 16ª and 17ª respectively for the reception of fabric covers 18. The ends of the covers 18 which are drawn over the projections 16 and 17 are attached thereto by means of wires 19 or in any other appropriate manner.

What I claim is:

A vehicle wheel, comprising an inner wheel-member, spokes pivoted thereto, cushions intermediate said member and spokes, an outer wheel-member, caps secured thereto and having radial inner grooves, pins on the spokes that engage said grooves, and cushions intermediate said spokes and outer wheel-member, substantially as specified.

Signed by me at Hamburg, Germany, this 11th day of June 1907.

FRIEDRICH JULIUS POTHS.

Witnesses:
CARL SPICKICHT,
ERNEST H. L. MUMMENHOFF.